Fig. 2

INVENTORS
Einar Thoresen
George E. Batchelder
By Strauch + Hoffman
Attorneys

Jan. 25, 1955  E. THORESEN ET AL  2,700,487
PREDETERMINING DISPENSING MECHANISM FOR FLUID METERS
Filed April 22, 1949  10 Sheets-Sheet 3

INVENTORS
Einar Thoresen
George E. Batchelder
By Strauch & Hoffman
Attorneys

INVENTORS
Einar Thoresen
George E. Batchelder
By Strauch & Hoffman
Attorneys

INVENTORS
Einar Thoresen
George E. Batchelder
By Strauch + Hoffman
Attorneys

INVENTORS
Einar Thoresen
George E. Batchelder
By Strauch & Hoffman
Attorneys

INVENTORS
Einar Thoresen
George E. Batchelder
By Strauch & Hoffman
Attorneys

United States Patent Office 2,700,487
Patented Jan. 25, 1955

2,700,487

PREDETERMINING DISPENSING MECHANISM FOR FLUID METERS

Einar Thoresen and George E. Batchelder, Pittsburgh, Pa., assignors to Rockwell Manufacturing Company, Pittsburgh, Pa., a corporation of Pennsylvania Application April 22, 1949, Serial No. 88,942

38 Claims. (Cl. 222—19)

This invention relates to predetermining dispensing mechanism for fluid meters and has for its general object and purpose to provide certain improvements in the dispensing mechanism disclosed in Patent No. 2,382,454 issued July 14, 1945, whereby greater accuracy is obtained in the delivery by the meter of a predetermined quantity of fluid.

Another object is to provide a novel fluid flow control valve of greatly simplified construction, the operation of which from open to closed position is controlled by the meter and a register device in two stages, with a minimum reactionary force on the meter tending to affect the accuracy thereof.

In the construction disclosed in the above mentioned patent, the two stage control of the fluid flow in relatively different volumes is accomplished by means of two independently operable axially movable valve members, which necessarily involves the use of relatively complicated mechanism for causing the operation of said valves to closed position at the proper time in the fluid dispensing cycle. In the present invention the valve means comprises a single oscillatory member with meter operated means controlling rocking movement of said member in valve closing direction until the major part of the predetermined quantity of fluid has been dispensed and gravity operated means controlling the final rapid movement of said member to fully close the valve.

A more specific object of the invention is to provide a control valve assembly comprising a plurality of resiliently yieldable flaps normally held by fluid pressure from the meter in sealing relation to fluid outlet openings, with fixed fluid flow directing blades and oscillatable blades between said fixed blades acting, upon movement in one direction, to lift said sealing flaps to open position. Preferably, the fixed and movable blades are spirally disposed about a common axis so that flow turbulence and pressure loss is considerably reduced, while the closing movement of the valve flaps under fluid pressure has a cushioning effect to minimize shock usually incident to the quick closing of an ordinary valve.

A further object of the invention resides in the provision of novel latch means for the valve operating mechanism and sensitively responsive trip means therefor which will result in complete closure of the control valve when the exact pre-set quantity of fluid has been delivered.

Another object is to provide valve operating means manually operable to open the valve and operable by gravity through both stages of closing movement of the valve.

An additional object is to provide an improved check valve to prevent reverse fluid flow through the control valve assembly.

A further object is to provide a simple and positively functioning latch mechanism for releasably connecting the meter with control means for the valve operating mechanism.

A still further object is to provide trip mechanism operatively controlled by the meter register and operable after a predetermined portion of the pre-set quantity of fluid has been dispensed, to release the meter latch and establish an operative connection between the meter and the control means for the valve operating mechanism.

Another object resides in the provision of novel means for releasably latching the valve operating means to the meter operated control means therefor, with means for manually releasing said latch means in case of emergency to quickly close the valve.

It also is an important object of the present invention to provide a novel mounting and arrangement of the several units of the predetermining mechanism in a cooperative assembly which may be closely grouped with the meter for installation in a comparatively limited space.

With the above and other objects in view, the invention comprises the improved predetermining dispensing mechanism for fluid meters as will hereinafter be fully described, illustrated in the accompanying drawings and subsequently incorporated in the subjoined claims.

In the drawings, wherein a preferred practical embodiment of the invention is illustrated, and in which similar reference characters designate corresponding parts throughout the several views.

Figure 1:
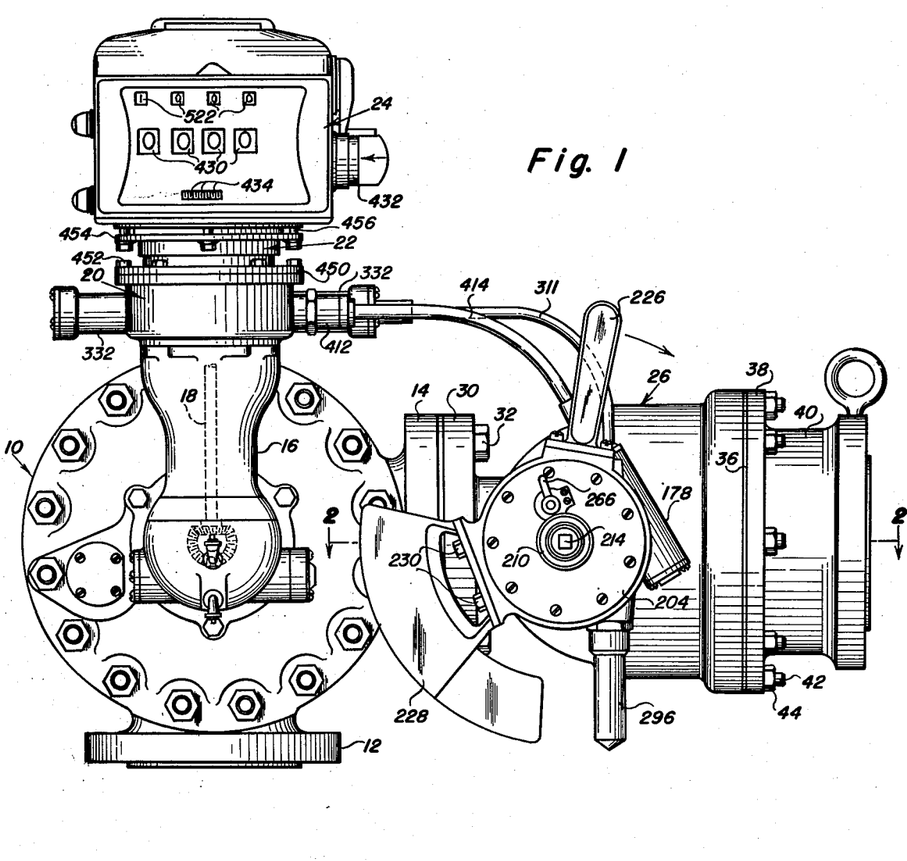
Figure 1 is a side elevation showing the general assembly of the several units of the present invention with a fluid meter of standard type.

In Figure 1 of the drawings a preferred general assembly of the several component units of the present invention is illustrated. The fluid pressure operated meter 10 may be of any approved type, such for instance as that disclosed in Patent No. 2,274,206, issued February 24, 1942, having a fluid inlet connection 12 and a fluid outlet connection 14. The meter is also provided with a suitable housing 16 for the vertically extending meter operated register drive shaft 18. Upon the upper end of this housing a latch box 20 is rigidly secured, which in turn is connected by an adaptor assembly 22 to the base of a register device 24.

The quantity control valve unit 26 and operating means therefor is rigidly attached to the fluid outlet connection 14 of the meter. Latch mechanism within the box 20, actuated by trip mechanism controlled by the register device 24 releasably connects meter driven shaft 18 with a control means for the valve operating means, all as will presently be described in further detail.

*Fluid control valve mechanism*

Figure 2:
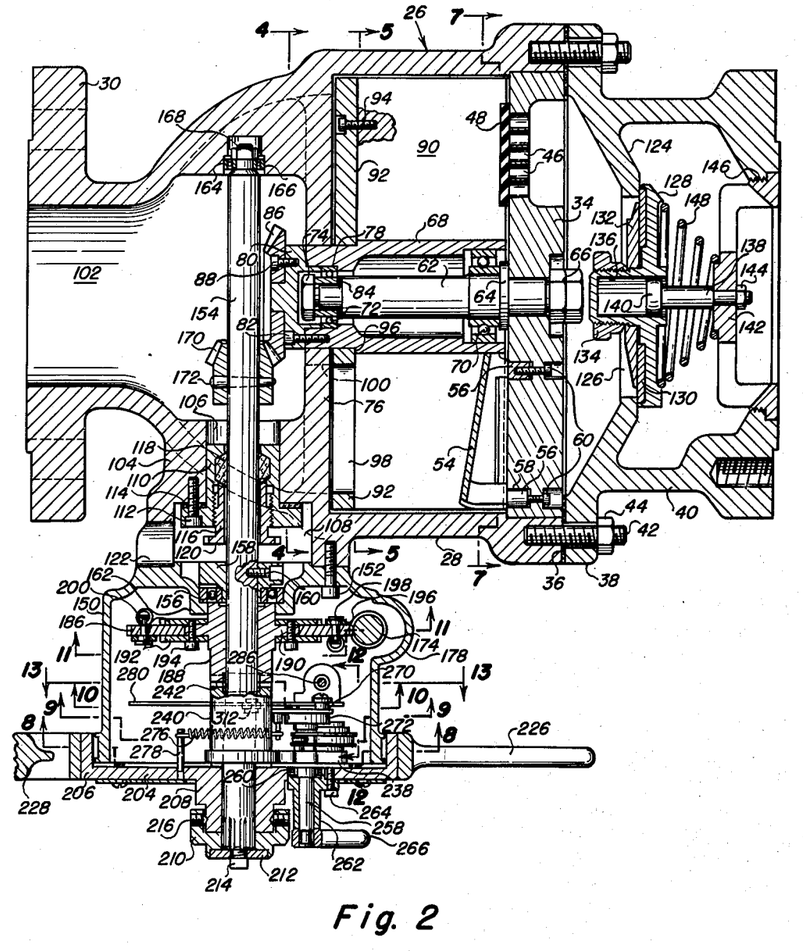
Figure 2 is a horizontal sectional view taken substantially on the line 2—2 of Figure 1.
Figure 4:
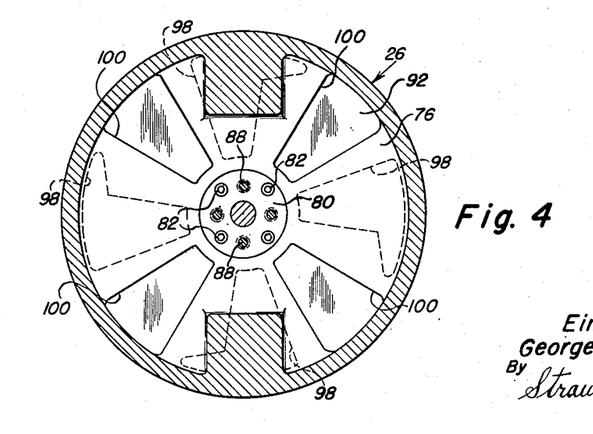
Figure 4 is a vertical sectional view taken substantially on the line 4—4 of Figure 2.

Control valve unit 26 comprises a valve body 28 having a bolting flange 30 at one end secured by bolts 32 to the complementary flange of the outlet connection 14 on the meter body. At its other end the valve body is counterbored to receive the valve plate 34 which is securely clamped and held by a gasket 36 interposed between the plate and valve body and an end flange 38 on a check valve body 40 secured to the end of the valve body 28 by stud bolts 42 and nuts 44.

Figures 5, 6, 7:
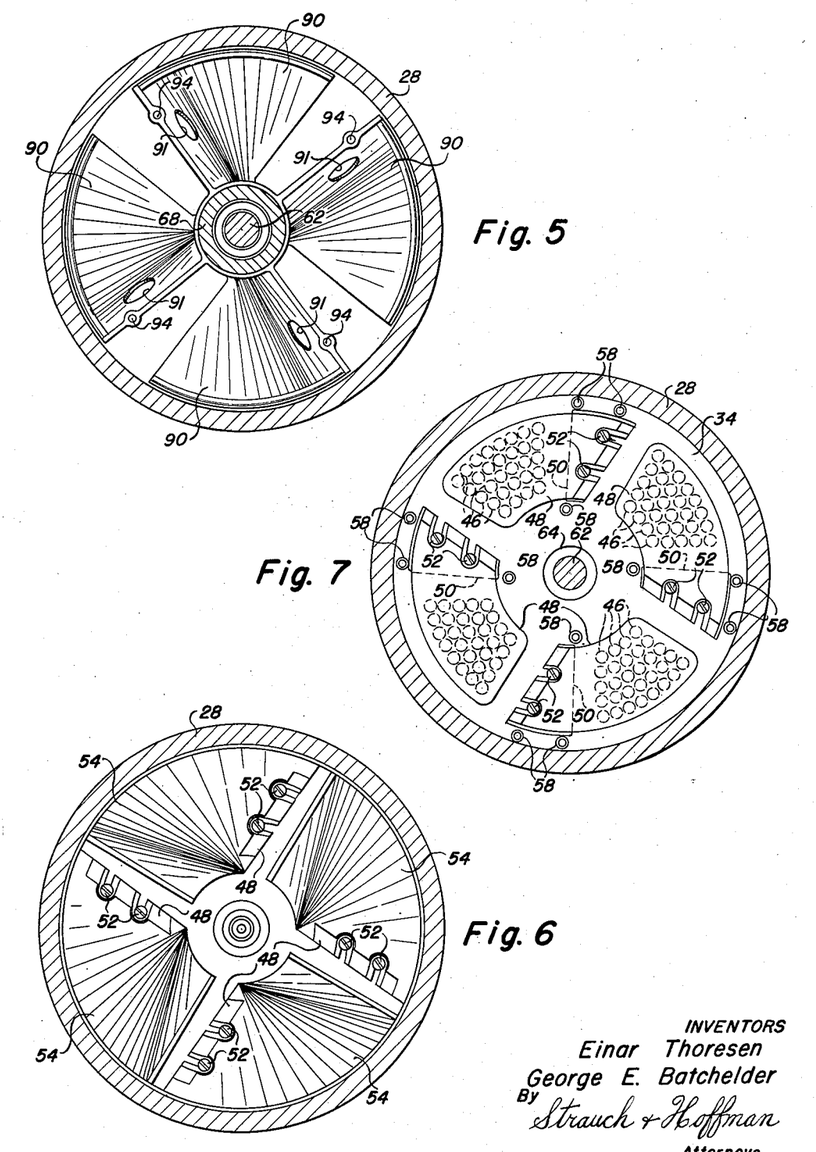
Figure 5 is a vertical section taken substantially on the line 5—5 of Figure 2.
Figure 6 is a similar sectional view, the valve lifter assembly being omitted to show the fixed flow directing blades.
Figure 7 is a vertical section taken substantially on the line 7—7 of Figure 2.

The valve plate 34 is provided with circumferentially spaced groups of small diameter openings 46, four such groups of openings being used in the present instance. With each group of openings at the inner side of plate 34, a flexible sealing flap 48 is associated. These flaps are preferably molded from synthetic rubber, such as "Hycar–OR–25" and at one of their ends are bonded to clamping plates 50 secured to the valve plate 34 by screws 52. The valve flaps are normally urged by the pressure of the liquid being measured against the face of the plate 34 to tightly seal the openings 46 therein.

Four stationary spiral blades 54 are provided at one end with tapped bosses 56 engaged in bores 58 opening on the inner face of valve plate 34 and rigidly secured to said plate by screws 60.

Figure 3:
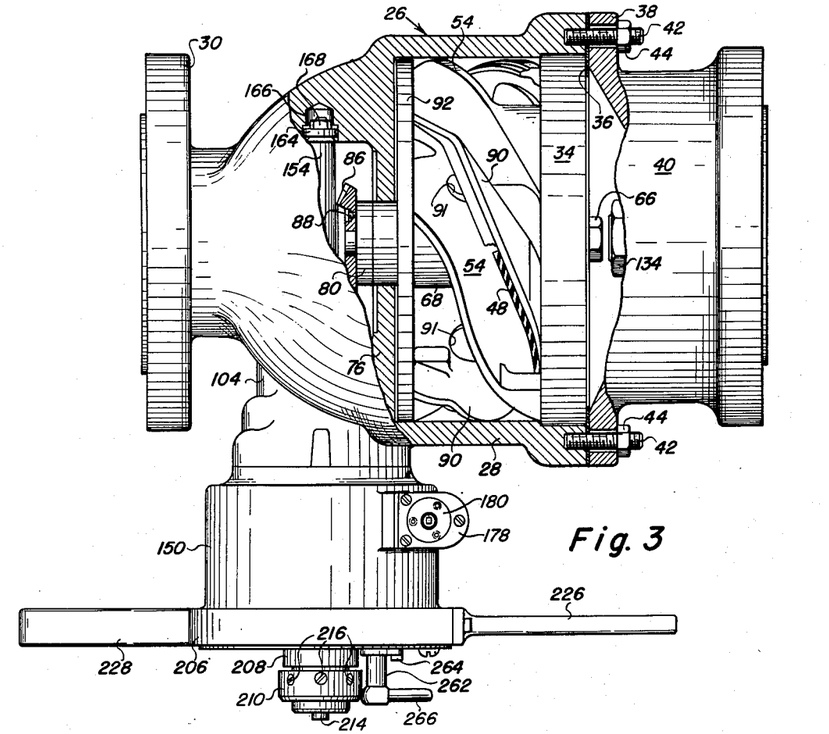
Figure 3 is a plan view of the control valve assembly, partly in section.

One end of a shaft 62 is rigidly fixed in valve plate 34 at its axial center between a flange 64 on said shaft and nut 66 threaded on the shaft end. Upon the shaft, a means for lifting flaps 48 to open the valve and for controlling the movement thereof to closed position under fluid pressure is oscillatably mounted. As shown most clearly in Figures 2 and 3, this means comprises a cylindrical hub 68 journalled on the shaft 62 by axially spaced anti-friction bearing assemblies 70 and 72, the latter being disposed between the other reduced end of the shaft and the hub wall and held against axial displacement by nut 74. This end of the hub 68 extends through a central opening in an intermediate internal wall 76 of the valve body 28.

The outer race of bearing assembly 72 is clamped in the counter-bore 78 of the hub wall by a flange on cap member 80 secured to the end of the hub by screws 82. Suitable shims indicated at 84 may be used to adjust the position of the valve lifter assembly on shaft 62 in correct clearance relation to the face of valve plate 34. A bevel gear 86 is secured to cap member 80 by screws 88.

Four movable spiral blades 90, each provided with an opening 91, are integrally formed with the hub 68 and disposed between the fixed spiral blades 54 in substantial parallelism therewith. The leading edges of the blades 90 are in clearance relation to the face of the valve plate 34 and are adapted to move under the free ends of the respective valve flaps 48 and lift the same to open position with respect to the associated groups of openings 46. The opposite side edges of blades 90 are rigidly secured to one side face of a plate 92 by screws 94. This plate has a central opening receiving a reduced end of the hub 68 and is in abutting contact with an annular shoulder 96 on said hub. The outer periphery of plate 92 and the outer edges of blades 90 are in clearance relation to the circumferential wall of the valve body 28 while the other side face of said plate is in clearance relation to the opposed face of the valve body wall 76.

The plate 92 between the attached ends of the blades 90 is provided with inlet openings 98 which, in the open position of the valve, are adapted to register with openings 100 in the valve body wall 76. Thus, most of the liquid delivered under pressure into chamber 102 of the valve body will be retained therein until the movable blades 90 have lifted the valve flaps 48 to partially open position which permits easier opening of the valve.

The wall of the valve body 28 is formed with a boss 104 having a bore 106 opening into the chamber 102 and counterbored at the outer end thereof as at 108. A stuffing box 110 is disposed in the bore 106 and secured to the valve body by screws 112 with gasket 114 providing a fluid tight seal. The adjustable gland 116 for packing 118 has a notched flange 120 on its outer end and may be readily adjusted by the insertion of a suitable implement or tool through an opening 122 in the side of boss 104.

Check valve body 40 is provided with an internal partition wall 124 having an opening 126 therein coaxial with shaft 62. A valve plate or disk 128 has a recessed side face to receive an annular valve seat member 130 of semi-soft rubber or other suitable material which is clamped to the valve disk by plate 132 and the nut 134 threaded on a hollow axially extending boss 136 of the valve disk. The valve disk 128 is slidably and pivotally supported on the convex periphery of a head 140 formed on one end of a stud 138 and which is disposed within the boss 136 on said disk. The other end of stud 138 is of reduced diameter and secured in a skeletonized spring retainer 142 by nut 144, said retainer being threaded in the wall of the valve body 40 as at 146. A compression spring 148 is interposed between valve disk 128 and retainer 142 to urge said disk and member 130 to normally closed position in seated engagement with the outer face of wall 124 around the opening 126 therein.

*Valve operating and latching mechanism*

To the end face of boss 104 on valve body 28 a housing 150 is secured by suitable stud bolts 152. A shaft 154 extending through stuffing box 110 is journalled in bearing 156 mounted on a collar 158 fixed to shaft 154 by set screw 160 and fitted within an internally projecting boss 162 on the rear wall of housing 150. Shaft 154 is disposed in the horizontal plane of shaft 62 substantially normal to the axis thereof, and extends transversely across the chamber 102 of valve body 28. At its rear end the shaft 154 is journalled in a bearing 164 mounted in recess 166 on the wall of the valve body and held against displacement by nut 168 threaded on the shaft end.

To the shaft 154 a bevel pinion 170 is fixedly secured by pin 172 and is in constant mesh with the bevel gear 86 on the hub 68 of the valve lifter assembly. As herein shown the ratio between the pinion and gear is 1:2 so that in angular movement of shaft 154 through 104 degrees the valve lifter assembly moves about fixed shaft 62 through 52 degrees.

The valve latch mechanism in housing 150 functions to retain the valve in fully open position until a predetermined amount of the pre-set quantity of fluid remains to be dispensed by the meter. At this time the meter controlled means is rendered operative to control the closing movement of the valve at a speed in direct proportion to the speed of the meter and when the entire pre-set quantity of fluid has been dispensed a final quick closing movement of the valve occurs.

This latch mechanism is most clearly shown in Figures 2 and 8 to 13 inclusive and comprises a worm 174, formed on an intermediate portion of a shaft 176. In the present instance this shaft is disposed at an oblique angle to a vertical plane containing the axis of shaft 154, within a lateral extension 178 on one side of the housing 150, the opposite ends of which are closed by cap members 180. These members are provided with suitable bearings 182 in which the ends of shaft 176 are journalled. The upper end of the shaft is formed with a coupling extension 184 for a purpose which will presently appear.

Worm 174 is in constant mesh with the teeth of an annular worm gear 186 which is rotatably supported on a flange 190 formed on a sleeve 188 loosely mounted on shaft 154. The gear is held in assembled relation to said flange by ratchet disks 192 secured to opposite side faces of the flange by screws 194. On each side face of the gear 186 a plurality of pawls 196 are pivoted as at 198 and are yieldingly held in engagement with the teeth of the respective ratchet disks by springs 200. The teeth of the ratchet disks face in the same direction and it will be seen from reference to Figure 11 that these disks and sleeve 188 may rotate in a clockwise direction as indicated by the arrow 202, while the worm gear 186 is held stationary by engagement with the worm 174. The worm 174 is of a self-locking type which prevents rotation thereof by a force exerted by the teeth of gear 186 on the worm teeth.

The outer open end of housing 150 is closed by a cover member 204 having a peripheral flange 206 extending inwardly over the housing wall and an outwardly projecting hub 208 which receives the forward end of shaft 154. A collar 210 is non-rotatably secured to the shaft by its splined center hole engaging splines on the shaft and by washer 212 and screw 214. The collar carries set screws 216 engaging a reduced end portion of hub 208 to lock the cover member to the shaft for rotation as a unit therewith relative to the housing 150.

The flange 206 of the cover member is cut away to provide circumferentially spaced shoulders 218 and 220 respectively for engagement with stop members 222 and 224 fixed to the wall of housing 150 to limit rotation of member 204 in each direction.

Figures 8, 9, 10, 11, 12:
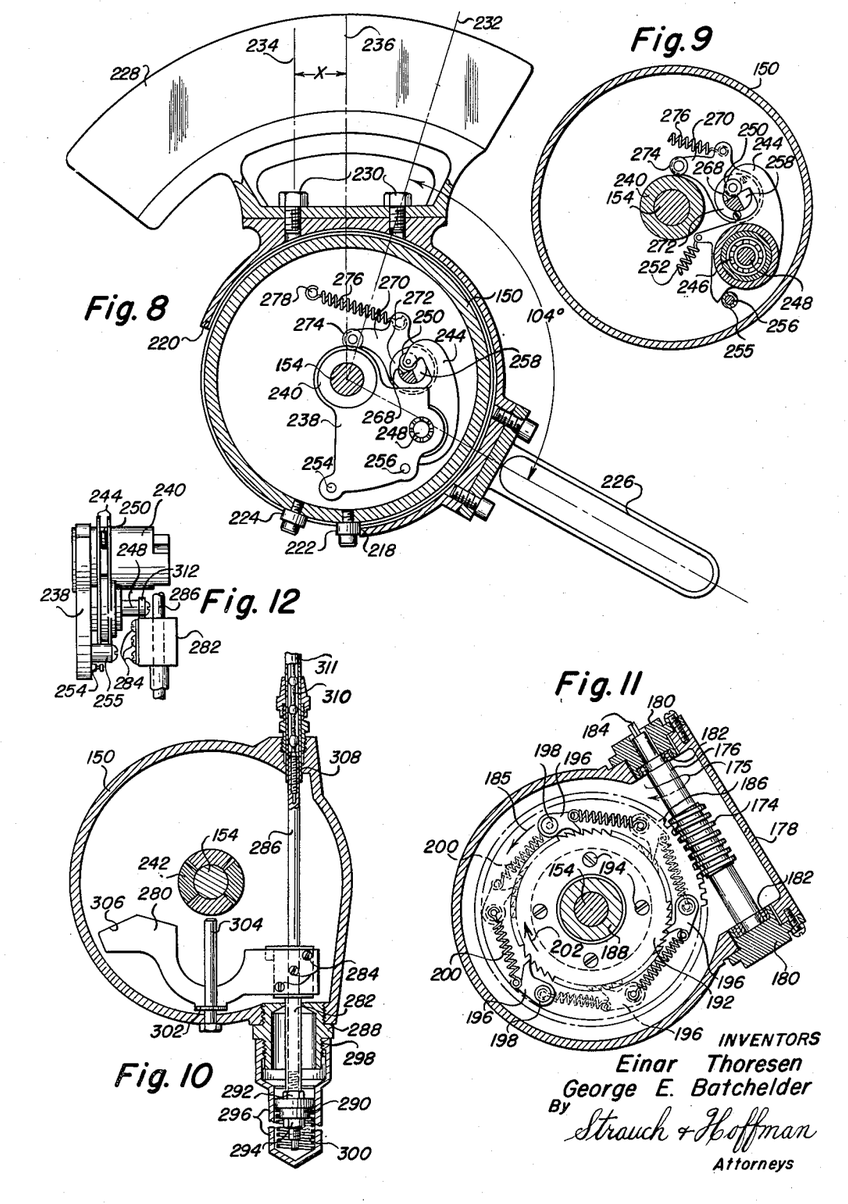
Figure 8 is a vertical section taken substantially on the line 8—8 of Figure 2.
Figure 9 is a similar sectional view taken substantially on the line 9—9 of Figure 2.
Figure 10 is a vertical section taken substantially on the line 10—10 of Figure 2.
Figure 11 is a similar section taken substantially on the line 11—11 of Figure 2.
Figure 12 is a detail elevation as indicated by the line 12—12 of Figure 2.

The control valve is opened by means of a suitable handle 226 attached to the flange of cover member 204. In circumferentially spaced relation from this handle a weight 228 of arcuately curved form is mounted on cover member 204 by stud bolts 230. As shown in Figure 8 the handle has been moved to fully open the valve from the closed position indicated by line 232 (Figure 13) through an angular path of 104 degrees. The final quick closing movement of the valve is accomplished by having the center of gravity of weight 228, indicated by line 234, spaced to the left from a vertical plane indicated at 236 which contains the axis of shaft 154. It will thus be seen that the available torque for closing the valve is a product of the weight and the distance X. Therefore as the weight moves in counter-clockwise direction to close the valve, the distance X will increase and result in a proportionate increase in the torque value. Thus, there will be gradual increase in torque during the throttling action of the valve followed by a maximum application of torque for the quick final closing of the valve.

A latch pawl carrier 238 is integrally formed on the outer end of a second sleeve 240 loosely mounted on shaft 154 within housing 150. The opposed ends of the sleeves 188 and 240 are provided with permanently engaged coupling jaws indicated at 242 so the two sleeves rotate as a unit with and relative to shaft 154. A latch pawl comprising spaced parallel plates 244 is pivotally supported at one end by ball bearing 246 on a stud 248 fixed to the carrier 238. The other ends of the plates 244 are laterally curved inwardly and between the same a roller 250 is mounted. A spring 252 is attached at one end to the pawl and at its other end to a pin 254 on carrier 238 and biases the pawl in one direction to contact a shoulder 255 on its pivoted end with a stop 256 on the carrier 238.

A latch shaft 258 is journalled in a bearing 260 mounted in the wall of cover member 204 and in a bearing sleeve 262 fixed to the outer side of said cover member by screws indicated at 264. A suitable handle 266 is attached to the outer end of said shaft for manual operation thereof. The shaft 258 has a milled portion providing a recess to receive the free end of the pivoted pawl 244, and the latching face 268 upon which roller 250 is adapted to engage.

A trip lever 270 is rigidly attached at one of its ends to the side face of a flange 272 on the inner end of shaft 258 and has a roller 274 mounted on its other end. A tension spring 276 connected to lever 270 and pin 278 on cover member 204 biases the shaft 258 to a normal position with roller 274 contacting the periphery of the sleeve 240. Thus, it will be seen from reference to Figures 8 and 13 that, in the movement of handle 226 from closed to open position in clockwise direction (Figure 1), the roller 250 of latch pawl 244 will latch over the face 268 on shaft 258 to hold the cover member 204 and shaft 154 against counter-clockwise rotation by gravity pull of the weight 228, and prevent the return of the control valve to closed position. In the clockwise rotation of shaft 154 to open the valve, the sleeves 188 and 240 are ratchet disks 192 rotate as a unit therewith while gear 186 is held stationary by worm 174.

Gear 186 can rotate only in counter-clockwise direction as shown by the arrow 185 in Figure 11 when worm 174 is rotated in clockwise direction, as indicated by arrow 175. However, it will be evident that the worm does not actually drive the gear but merely permits or allows the gear to rotate by the gravity pull of weight 228 which, through the several connecting parts, tends to move the worm gear in counter-clockwise direction. Therefore, the worm 174 merely controls or governs the closing speed of the control valve.

The trip rod assembly shown in Figure 10 supplies the force for operatively connecting the meter with the worm 174 to start the throttling action of the control valve and also actuates lever 270 to release the latch connection between cover member 204 and latch pawl carrier 238 for the independent rotation of shaft 154 and the final quick closing of the valve. This assembly comprises an arm 280 having an intermediate U-shaped portion to accommodate the sleeve 240. One end of this arm is secured to a sleeve 282 by screws 284 one of which fixedly secures the sleeve to a vertically disposed rod 286. The lower end of this rod extends into a hollow bushing 288 threadedly secured to the wall of housing 150 and is provided with a plunger head 290 secured against axial movement on the rod by nuts 292 and 294 threaded on said rod.

Figure 13:
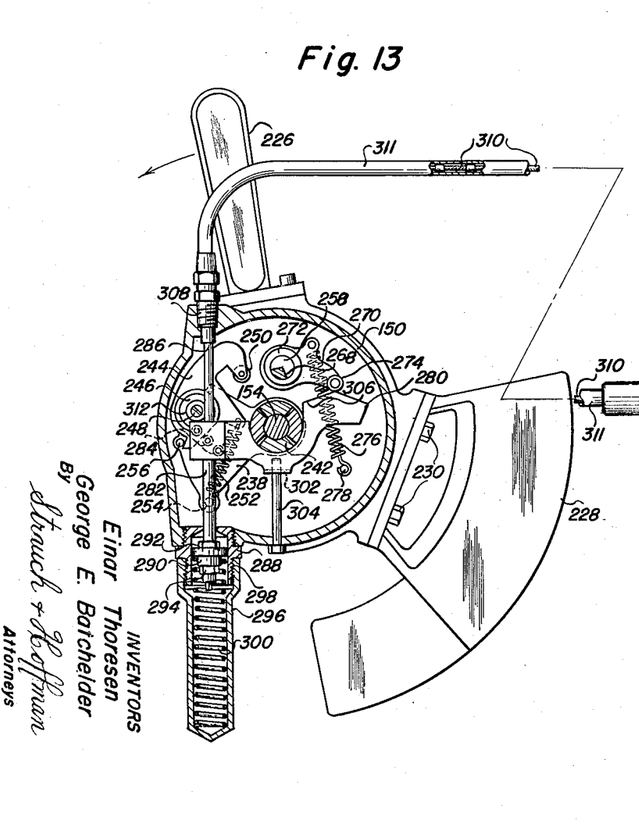
Figure 13 is a vertical section similar to Figure 8, looking in the opposite direction and showing the valve operating handle in closed position.

A tube 296 has a threaded connection 298 at its upper end with bushing 288 and contains a compression spring 300 yieldingly urging the rod 286 and arm 280 upwardly to the normal position seen in Figure 13.

The arm 280 is provided with an apertured lug 302 slidably engaged with a vertical rod 304 fixed at its lower end to the wall of housing 150. By adjusting the sleeve 282 and plunger head 290 on rod 286 the proper vertical travel of the arm 280 may be obtained. The arm 280 at the other side of sleeve 240 is provided with an inclined cam edge 306 to engage roller 274 on lever 270 and rock shaft 258 to latch releasing position. In case of emergency said shaft may be manually operated at any time by handle 266 for the quick closing of the control valve by weight 228.

The upper end of rod 286 is slidably guided in a bushing 308 mounted in a boss on housing 150 and connected to a push-pull cable 310, operating within a protecting tube 311, which is connected with a part of the mechanism in meter latch box 20 to be presently described in detail.

Upon the end of pivot stud 248 for pawl 244 a roller 312 is mounted and it will be evident that when handle 226 is swung downwardly from the position of Figure 13 to that shown in Figure 8, said roller will force the arm 280 and rod 286 downwardly to the position seen in Figure 10, when the pawl 244 is in latched engagement with shaft 258. The trip rod assembly is retained in this depressed position with the spring 300 compressed, by the meter latch mechanism.

*Meter latch mechanism*

The mechanism contained in latch box 20 for releasably connecting meter driven shaft 18 with the worm 174 is clearly illustrated in Figures 14 to 19 of the drawing. As most clearly shown in Figure 16, the bottom wall of the latch box 20 is provided at its axial center with an upstanding boss 314 in which the lower end of a vertical post 316 is suitably fixed. This post is hollow and is provided with suitable bearings 318 in the upper and lower ends thereof in which a motion transmitting shaft or spindle 320 is journalled. The lower end of this shaft carries a fixed gear 322 and the coupling member 324 for connection with a similar member on the upper end of the meter driven shaft 18. A similar coupling member 326 is also suitably fixed to the upper end of shaft 320 for transmission of the drive to operating gearing for the register 24 as will be later described.

Rearwardly of the post 316, a rack bar 328 is mounted for horizontal rectilinear movement and provided at its opposite ends with heads 330 slidably guided in the tubular extensions 332 formed on opposite sides of the body wall of the box 20. With the right hand end of this rack bar 328 the other end of the push-pull cable 310 is connected.

A gear 334 is in constant mesh with the teeth of rack bar 328, said gear being fixed to a stud shaft 336 journalled in a bearing bushing 338 mounted in the bottom wall of the box 20 and held against axial movement by cotter pin 340. Gear 334 is in constant mesh with a pinion 342 fixed to the under side of a latch arm 344 at the center thereof which is mounted to freely rotate on the vertical stud 346 fixed in the bottom wall of the box. The rotation of this arm and pinion 342 in clockwise direction is normally prevented by the engagement of one end of said arm against an upstanding end portion 350 on a latch lever 348. At its other end this lever is supported for pivotal rocking movement upon a pin 352 secured at its opposite ends in a bearing block 356 by means of clamping bars 358 and screws 360. The upper end of a rod 362 suitably fixed to the bottom wall of the box extends through an opening in the lever 348, and a coil spring 364 on said rod yieldingly urges the lever upwardly to normal position with its end 350 in the path of movement of the arm 344.

Upon the post 316 above the boss 314 a sleeve 366 is slidably supported, said sleeve being yieldingly urged upwardly to a normal position by the coil spring 370 interposed between the lower end of said sleeve and the boss 314. At its lower end, the sleeve 366 is formed with a bifurcated radial extension 371, Figure 19, receiving the upper end of a guide stud 372 fixed to the bottom wall of the box, which prevents rotative movement of said sleeve. The lower end of sleeve 366 is also provided with an arm 374 having a stop lug or extension 376 formed on one edge thereof with which a trip finger 378 pivoted on said said arm, as at 380, is normally yieldingly held in abutting contact by spring 382. The finger 378 is disposed directly above the lever 348 and is adapted to depress the same against the resistance of spring 364 to release the latch arm 344.

A disk 384 bears on the upper end of sleeve 366 and to said disk a plate 386 of relatively large diameter is secured by the screws indicated at 388. The lateral displacement of disk 384 is held to a minimum, by opening 387, with respect to the smaller upper part 389 of post 316.

A lever 390 is mounted for pivotal movement on the boss 314 in coaxial relation with shaft 320. The opening in the lever which receives the boss has a radial extension indicated at 392 in Figure 19 which accommodates the fixed post 372. At one side of the boss 314, a vertically disposed stud shaft 394 (Figure 16) is rotatably mounted in the lever 390 and has a gear 396 secured thereto. This stud shaft extends downwardly through an opening 397 in the bottom wall of the box 20 and also has a gear 398 fixed to its lower end which is in constant mesh with the gear 322 on the shaft 320.

A spring 400 (Figure 15) connected to the end of the lever 390 on the opposite side of the boss 314 tends to bias said lever in clockwise direction and hold the gear 396 in mesh with a gear 402 rotatably mounted together with a bevel gear 404 (Figure 14) on the upper end of the vertical stud shaft 406 fixed in the bottom wall of the latch box 20. Gear 404 is in constant mesh with a similar bevel gear 408 on the inner end of a shaft 410 journalled in suitable bearings contained in an externally projecting housing 412 on the wall of box 20. The end of shaft 410 is coupled by a flexible drive shaft 414 (Figure 1) to the coupling extension 184 on the end of worm shaft 176 (Figure 11).

To the rear side of rack bar 328 longitudinally spaced cam lugs 416 and 418 respectively are attached. A lever 420 pivoted at one of its ends on the bottom wall of the latch box, as at 422, carries a roller 424 with which said cam lugs are adapted to coact in the rectilinear movement of the rack bar. The other end of lever 420 is pivotally connected by link 426 to the end of lever 390 adjacent gear 396.

Figure 14:
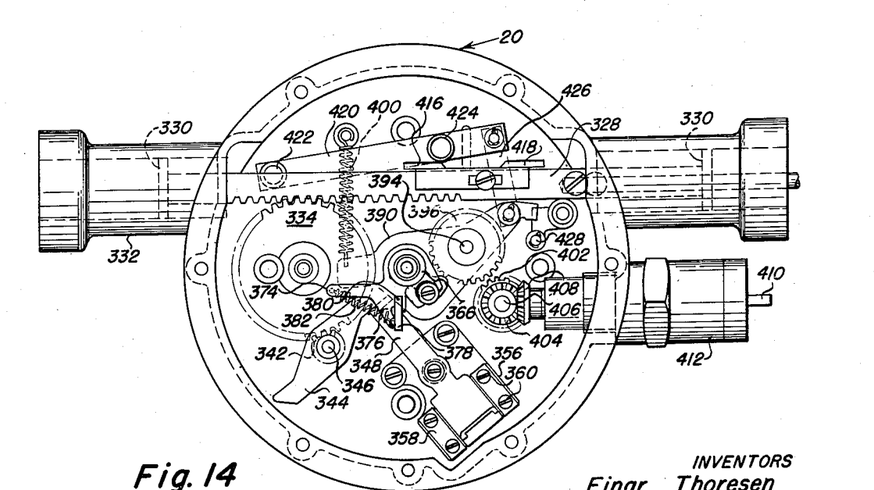
Figure 14 is a plan view of the meter latch mechanism, the meter being disconnected from the control means for the valve operating means.

As thus far described, it will be apparent that when handle 226 is moved to the position of Figure 8 to open the valve and trip arm 280 is depressed to the position of Figure 10, rack bar 328 is moved to the right by the cable 310 to the position shown in Figure 14. As cam lug 416 rides under roller 424, the lever 420 is pivotally moved, and through link 426 rocks lever 390 in counter-clockwise direction against the resistance of spring 400 to disengage gear 396 from the gear 402. In this movement of the rack bar, latch arm 344 moving in counter-clockwise direction displaces the yieldably held finger 378 as the end of the arm moves to a position behind the end of the latch lever 348. The leading edges of the end portions of arm 344 are beveled as indicated at 345 in Figure 18 of the drawings so that they will safely ride over the end 350 of lever 348, slightly depressing the lever against resistance of spring 364.

The energy stored in spring 300 (Figure 10) constantly tends to move rack bar 328 to the left. Such movement however is prevented since the gear 334 and pinion 342 are latched against turning movement by lever 348 and arm 344, thus retaining the gear 396 in disengaged position with respect to gear 402 so that closing movement of the valve under gravity pull of weight 228 will be prevented by the worm 174 and connecting parts with the latch means on cover member 204 by which the weight is carried.

Figure 15:
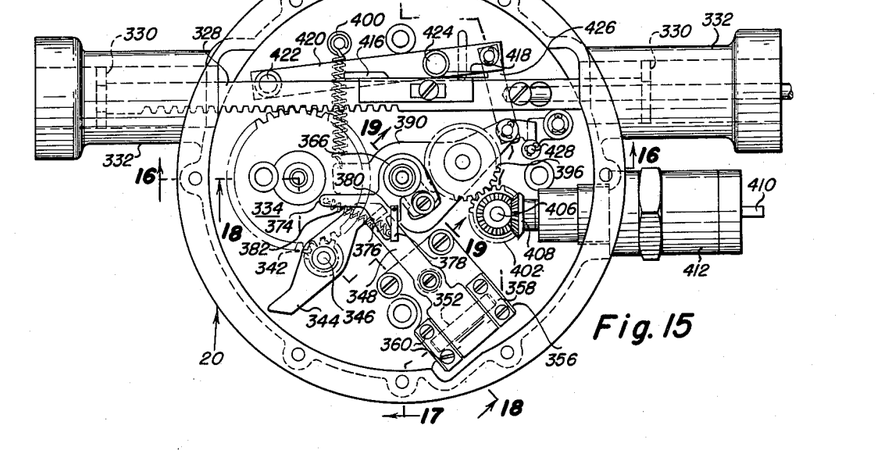
Figure 15 is a similar view showing the position of the parts after release of the latch and with the meter connected with the valve control means.
Figure 16:
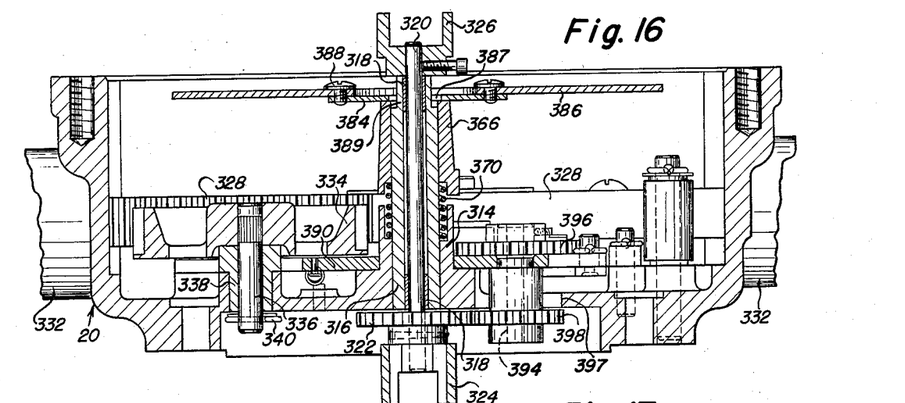
Figure 16 is a vertical section taken substantially on the line 16—16 of Figure 15.
Figure 17:
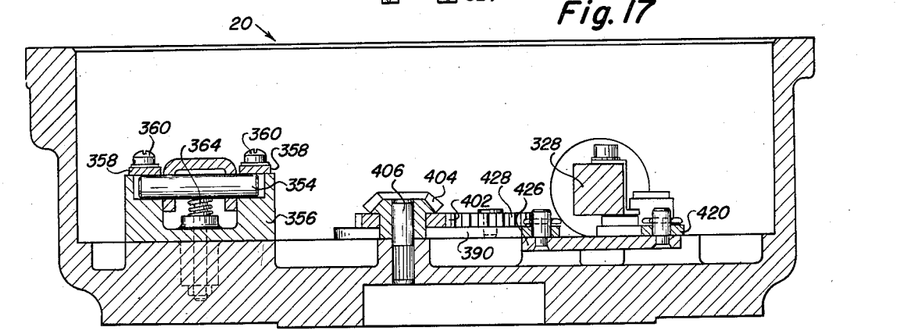
Figure 17 is a similar section taken substantially on the line 17—17 of Figure 15.
Figures 18, 19:
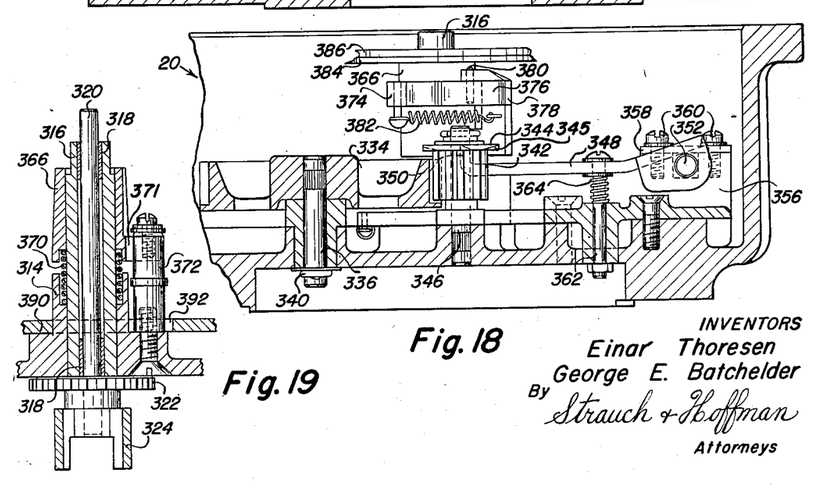
Figure 18 is a vertical section taken substantially on the line 18—18 of Figure 15.
Figure 19 is a similar section taken substantially on the line 19—19 of Figure 15.

When a downward pressure force is applied to plate 386 by register controlled trip mechanism to be later described, after a predetermined amount of the pre-set quantity of fluid has been dispensed by the meter, say 800 of a thousand gallon pre-set quantity, the sleeve 366 will be moved downwardly to cause trip finger 378 to depress the lever 348 and disengage its end 350 from the arm 344. Rack bar 328 will then move to the left under the force of spring 300 for approximately ¾″ and gear 334 will rotate in anti-clockwise direction while pinion 342 rotates in clockwise direction until the arm 344 has made one half turn and the other end thereof engages the end 350 of the lever 348. In this movement of the rack bar, roller 424 on lever 420 rides off of cam 416 so that spring 400 then rocks lever 390 in clockwise direction to engage gear 396 with gear 402, such movement being limited by the engagement of said lever with a fixed stud 428 on the wall of latch box 20 (Fig. 15). Worm 174 will then be driven from the meter driven shaft 18 to control the throttling action of the valve and movement thereof towards closed position under the gravity pull of weight 228, as above explained.

After the final 200 gallons of the pre-set quantity has been delivered by the meter, the meter latch mechanism is again operated at the zero reading on the meter register. When latch lever 348 is again tripped in the manner described, there will be a further movement of rack bar 328 to the left under the force of spring 300 for approximately ¾″, in which movement the roller 424 is engaged by cam 418 on the rack bar which actuates lever 420 and link 426 to move lever 390 in counter-clockwise direction and disengage gear 396 from gear 402.

*Register controlled trip mechanism*

The register 24 is generally of well known type to which certain additions have been made for the proper operation of the meter latch tripping mechanism. It includes a main set of digit wheels 430 upon which the gallons delivered are registered, with a set back rod 432 to restore the wheels to zero position, together with a set of totalizing digit wheels 434. The operating gearing for these digit wheels is of conventional construction and a detailed description thereof is not required for the adequate disclosure of the present invention. It will suffice to state that the sets of registering wheels with drive gearing therefor are mounted in a suitable frame structure 436 carried by a base plate 438.

The adaptor unit 22 comprises an annular member 440, formed with an external annular shoulder 442 and having an inwardly extending flange 444 on its lower edge to which a plate 446 is secured by screws 448 which also secure the adaptor assembly upon a cover member 450 for the latch box 20 attached to a top flange thereof by screws 452. From reference to Figure 20 it will be noted that plate 386 at its outer edge has bearing contact with cover member 450 to fulcrum thereon when said plate is tilted by the register actuated trip rod as presently described.

The register is adjustably clamped to the adaptor member 440 by a ring 454 having bearing contact at its inner edge on the flange 442, and a plurality of stud bolts 456 extending upwardly through openings in said ring and threaded in tapped openings in the frame base 438 of the register; friction washers 455 acting between ring member 454 and heads of stud bolts 456 will frictionally hold the register upon the top of member 440.

Figure 20:
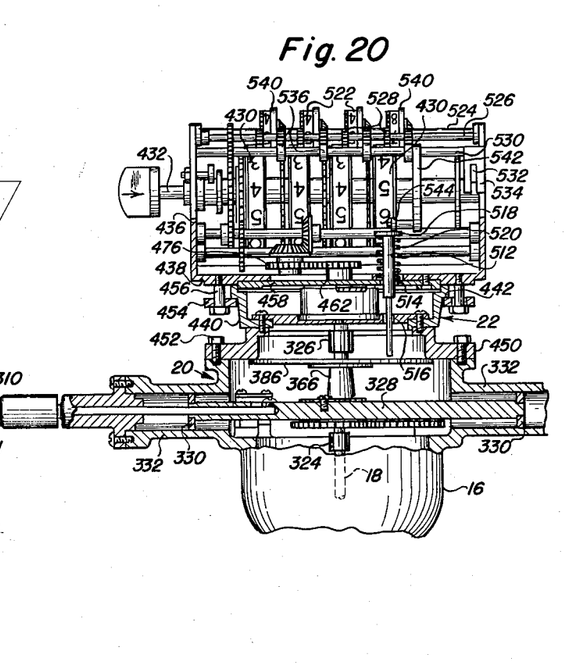
Figure 20 is a vertical section at the rear side of the register through the meter latch box and adaptor units.
Figures 21, 22, 23:
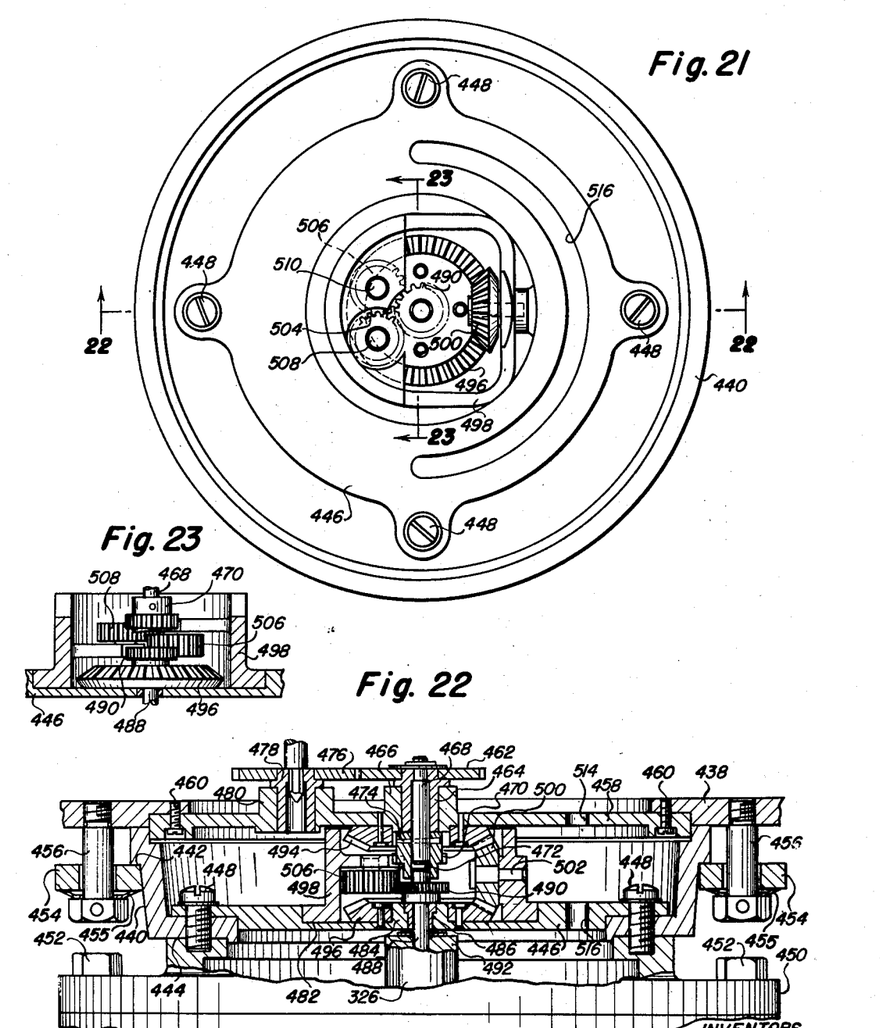
Figure 21 is a plan view of the adaptor unit.
Figure 22 is a vertical sectional view taken on the line 22—22 of Figure 21.
Figure 23 is a similar section on line 23—23 of Figure 21.
Figure 24:
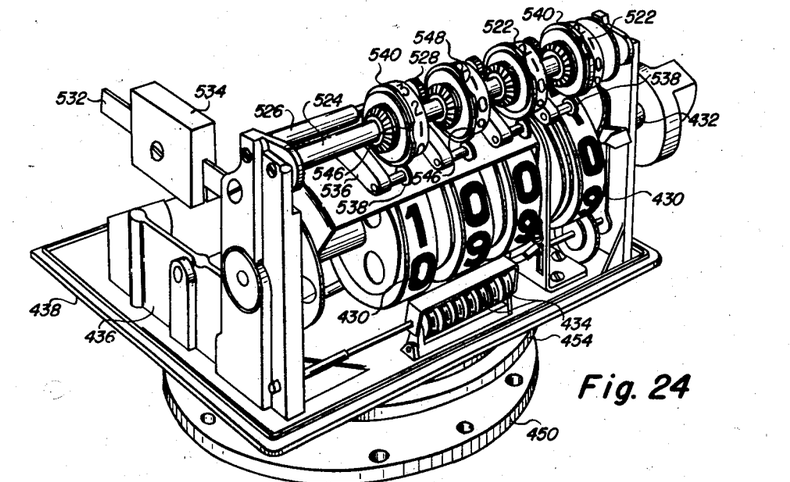
Figure 24 is a front perspective view of the register.

A large diameter plate 458 is attached to the register base 438 by screws 460 and carries parts of the drive gearing for the digit wheels 430 of the register. One of these gears 462 is fixed to the upper end of a stud shaft 464 journalled in bearing boss 466 on the plate 458. The shaft 464 has an axial bore in which spindle 468 is fixed and a pinion 470 having a bore 472 is fixed to the lower end of this spindle by pin 474. An intermediate gear 476 is in constant mesh with gear 462 and fixed to stud shaft 478 journalled in a second boss 480 on plate 458. This gear transmits motion to other elements of the register drive gearing as shown in Figure 20.

The plate 446 is provided in its upper surface with a circular recess 482 and a boss 484 on the base wall thereof containing a bearing bushing 486 for a spindle 488 which is coaxial with the spindle 468 and has a pinion 490 fixed on its upper end. This end of the spindle 488 is piloted within the bore 478 of pinion 470. Below plate 446 a coupling member 492 is secured to spindle 488 for engagement by coupling member 326 on the upper end of motion transmitting shaft 320 mounted in latch box 20.

In concentric relation with spindle 468 and pinion 470 a bevel gear 494 is rigidly fixed to the lower face of the plate 458 and a similar gear 496 of the same diameter is secured in recess 482 to the plate 446 in concentric relation to boss 484. A cylindrical housing member 498 has an outwardly flanged lower end rotatably mounted in the recess 482 and surrounds the gears 494 and 496. A bevel pinion 500 journalled on stud 502 fixed in the housing wall is in constant mesh with said gears. Within housing 498 opposite the pinion 500 intermeshing gears 504 and 506 are journalled on vertical studs 508 and 510 respectively fixed in projections on the housing wall 498. Pinion 490 is in mesh with gear 506 and pinion 470 in mesh with gear 504 to thereby transmit the drive from meter driven shaft 18 and shaft 320 to the register operating gear 462.

In many truck tank filling installations, provision is made for filling the tank from either of two sides of a platform upon which the meter is located. Thus it becomes necessary to change the position of the register relative to the meter so that the digit wheels of the register can be easily read in filling the truck tank from either side of the platform. From the above description, it may be readily seen that by the provision of the intermediate gearing between spindles 468 and 488 within the rotatable housing 498, the register 24 can be angularly moved to the desired position relative to the meter without operation of the register drive gearing which would change the reading of the meter and result in inaccurate delivery of the fluid.

A vertically disposed trip rod 512 is movable through an opening 514 in plate 458 at the rear side of the register wheels and extends downwardly through a slot 516 in plate 446 extending for substantially 180 degrees around and in concentric relation to the housing 498. The upper end of this rod is provided with a head 518 and a spring 520 disposed between said head and the plate 458 yieldingly urges the rod upwardly to the position seen in Figure 20 of the drawings and with its lower end extending approximately 1/16" above upper surface of plate 386 of the register latch tripping mechanism.

Above the main register wheels 430 a corresponding number of relatively small diameter digit wheels 522 are mounted on shaft 524 fixed in the frame 436 and these wheels are operated in synchronism with the digit wheels 430 to set up the predetermined quantity of fluid to be delivered. The unit wheel 522 is driven directly from the large unit wheel 430. Rearwardly of shaft 524 a shaft 526 is mounted in the frame 436 and carries transfer pinions 528 by which the other wheels 522 are progressively moved in descending order in a ten to one ratio. In the present instance four digit wheels 430 and 522 are shown but a greater or less number may be used as desired.

Figure 25:
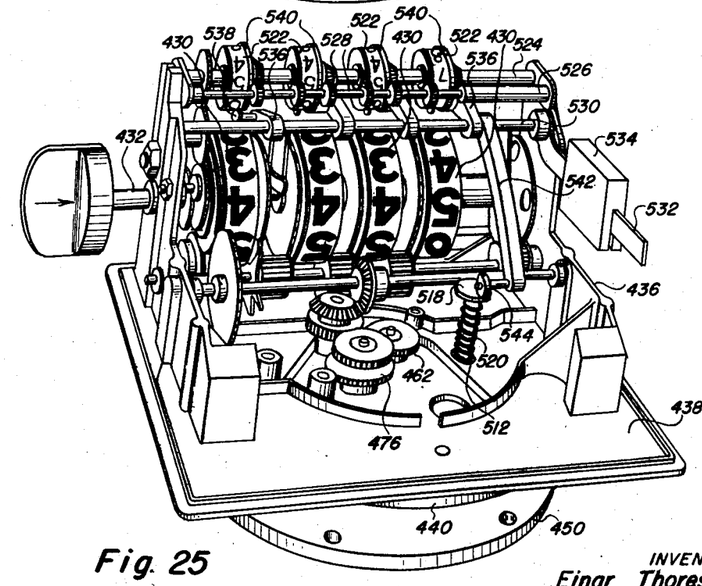
Figure 25 is a rear perspective view of the register.

Rearwardly from the shaft 526 and slightly below the same a shaft 530 is rotatably journalled at its ends in frame 436. An arm 532 fixed to one end of this shaft and having weight 534 attached thereto tends to rotate said shaft in clockwise direction as seen in Figure 25. To the shaft 530 spaced forwardly projecting arms 536, corresponding in number with digit wheels 522, are fixed. At their forward ends these arms carry rollers 538 which are held by weight 534 in contact with the peripheries of disks or plates 540 fixed to one side of the respective digit wheels 522. A relatively long arm 542 fixed at one end to the shaft 530 extends rearwardly and downwardly from said shaft and at its other end carries a roller 544 in bearing contact with the head 518 of trip rod 512.

Each of the disks 540 is provided with a peripheral notch 546 and the disk on the hundreds wheel has an additional notch 548. These notches 546 and 548 are so located that when 200 gallons of the pre-set quantity of fluid remains to be dispensed through the control valve notches 546 of unit, tens and thousand wheels and notch 548 of the hundred wheel will be in alignment to receive the rollers 538 on arms 536 under the pull of weight 534. The rear end of the arm 542 will thus move downwardly and trip rod 512 will be depressed by roller 544, tilting plate 386 and forcing sleeve 366 downwardly to release latch arm 344 and connect the meter with the control worm 174 to start the throttling action of the control valve as above explained.

After the total pre-set quantity of fluid has been dispensed, when all of the digit wheels 522 register zero, the notch 546 of the hundreds wheel will then be in alignment with the notches 546 of the other wheels 522 and trip rod 512 will again be depressed and release latch arm 344, so that, in the continued movement of rack bar 328 under the force of spring 300 the meter is disconnected from worm 174, whereupon a high torque is applied to shaft 154 by weight 228 to quickly close the control valve and abruptly cut off further passage of fluid through said valve.

*Operating cycle*

Assuming that it is desired to dispense one thousand gallons of fluid delivered by meter 10 in each operation of the control valve unit 26, this number is first set up upon the digit wheels 522 of the register 24. The handle 226 is then moved in clockwise direction from the position shown in Figure 1 to the position shown in Figure 8, in which the sleeves 240 and 188 (Figure 2) are latched to the shaft 258 by pawl 244 and shaft 154 is rotated to transmit rotation to the movable blades 90 of the valve control unit, thereby lifting the flexible valve flaps 48 so that the fluid delivered from the meter may flow in spiral streams of maximum volume between the fixed and movable blades 54 and 90 and through openings 46 in valve plate 34, the fluid pressure unseating the check valve 128 and being discharged through a flexible hose or other connection, into the truck tank. In this opening movement of the valve the arm 280 is forced downwardly, placing spring 300 under compression and moving rack bar 328 to the right so that the meter is disconnected from worm 174, as seen in Figure 14. The several parts connected with the handle 226 and weight 228 are thus locked by the worm 174 against movement to retain the control valve in its full open position. When 800 gallons of fluid have been delivered through the control valve and the 200 remaining gallons are registered on the wheels 522 of the register, the trip mechanism controlled by the register will then operate to release the meter latch in the manner above described and establish a driving connection between the meter driven shaft 18 and the worm 174, in the manner above described. The worm now controls the rotation of gear 186 and the connecting parts between said gear and member 204, under the gravity movement of the weight 228 so that a throttling action on the flow of fluid through the control valve takes place as the blades 90 thereof are moved relative to fixed blades 54 to release flaps 48 which progressively cover and seal the openings 46 in each group so that there is a progressively diminishing flow of the fluid through the control valve. When the final 200 gallons have been dispensed, the register controlled trip mechanism again operates to release the meter latch so that the cam means on rack bar 328, under the force of spring 300, acts to disconnect the meter from worm 174 as previously described. At the same time, arm 280 exerts an upward force on roller 274, rocking shaft 258 to release the pawl 244, thus disconnecting member 204 from the sleeve 240 so that high torque will then be applied in the gravity movement of weight 228 to shaft 154 to rotate said shaft relative to sleeves 240 and 188 and thereby quickly complete the final closing of the control valve, in which all of the openings 46 in each group are completely sealed by the valve flaps 48. Check valve 132 prevents back pressure on flaps 48 and reverse flow of fluid through opening 46. In this manner, the flow of fluid through the control valve is abruptly cut off without shock and the valve is operated with a high degree of accuracy to dispense the predetermined quantity of fluid, within approximately 1/10 of a gallon.

From the foregoing description and the accompanying drawings, it is thought that the construction and manner of operation of the present invention may be clearly and fully understood. It will be seen that by the use of my improved control valve, the fluid flow delivered from the meter is substantially in a straight line to the discharge hose connection so that turbulence and resultant pressure loss will be considerably reduced from that experienced with conventionally designed valves as heretofore used in such mechanisms. Also the valve will easily open with a minimum of force against prevailing normal pressures at gasoline and fuel oil loading racks, as the movable blades 90 will engage and lift the valve flaps 48 before they are subjected to the full fluid pressure from the meter. The throttling closing action of the valve is controlled by the meter in proportionate ratio to the operating speed of the meter and with a minimum of force to effect such throttling action, thereby avoiding reactionary forces on the meter tending to render the same inaccurate. The several latch devices and trip mechanism are sensitively responsive in operation so that the predetermining mechanism will function in a positive and reliable manner to deliver the pre-set quantity of gasoline or other liquid with maximum accuracy. Finally it will be noted from reference to Figure 1 of the drawings that the present invention provides a very compact arrangement and grouping of the several operating units with respect to the meter so that installations may be readily made where the available space is comparatively limited.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. Fluid dispensing apparatus comprising a fluid meter, valve means controlling fluid flow through said meter, actuating means for said valve means including a shaft operatively connected with the valve means, a weighted operating member fixed to said shaft manually operable to open the valve means and operable by gravity to close said valve means, means for controlling closure of said valve means in proportionate ratio to the operating speed of the meter, latch means operative to releasably connect said control means to said member in the manual operation of said member, said control means comprising means effective to restrain said member against gravity operation to retain the valve means in full open position, and means for operatively connecting said last named means with the meter when a predetermined amount of fluid has passed the valve means to initiate and control the closing of said valve means.

2. Fluid dispensing apparatus as defined in claim 1, wherein said latch means includes a part carried by said weighted member and manually operable to release the connection between said member and the control means.

3. Fluid dispensing apparatus as defined in claim 1, together with means for automatically rendering the connecting means between the meter and control means inoperative after a further amount of fluid has passed the valve means, and additional means simultaneously operative to trip said latch means and disconnect said member from the control means, whereby continued gravity operation of said member effects a rapid final closure of the valve means.

4. Fluid dispensing apparatus comprising a fluid meter, valve means controlling fluid flow through said meter, means for actuating said valve means to open and closed position, means for operating said actuating means in valve closing direction, means for controlling effective operation of said operating means, means for releasably connecting said control means with said operating means, said control means comprising a primary control member, mechanism for operatively connecting said member with the meter, an energy storing device operatively connected with a part of said mechanism, means operated in the movement of said valve actuating means to open the valve to energize said device and to condition said mechanism to prevent operation of the control member by the meter, latch means for said mechanism, register operated trip means for releasing said latch means, said mechanism including means rendered operative by the energy stored in said device upon a first release of said latch means when a predetermined amount of fluid has passed the valve means to establish an operative connection between a meter driven shaft and said control member, and to disestablish said operating connection upon a second release of said latch means by the register operated trip means, after a further quantity of fluid has passed said valve means.

5. Fluid dispensing apparatus as defined in claim 4, and means actuated by said energy storing device substantially simultaneously with the disconnection of the meter from said control member to release the connecting means between said operating means and the control means therefor.

6. Fluid dispensing apparatus as defined in claim 4, wherein said control member comprises a worm operatively connected with said mechanism by a flexible drive shaft.

7. Fluid dispensing apparatus as defined in claim 4, wherein said energy storing device is connected to a rectilinearly movable part of said mechanism by a push-pull cable.

8. Fluid dispensing apparatus as defined in claim 4, wherein said valve actuating means is rotatively actuated by said operating means, and said control means includes a one way driving connection between said primary control member and said operating means.

9. In predetermining mechanism for fluid meters having a fluid control valve and actuating means therefor, means for operatively connecting said actuating means with the meter to control closing movement of the valve at a speed proportionate to the speed of the meter, said connecting means comprising an energy storing device, means energizing said device in the operation of said actuating means to open the valve, power driven control means operatively connected with said actuating means, a meter driven shaft, and additional means operatively controlled by said energy storing device to connect and disconnect said meter driven shaft at predetermined times to and from said power driven control means and govern closing movement of the valve in each operating cycle of the meter.

10. In predetermining mechanism for fluid meters as defined in claim 9, a latch device restraining said last named means against operation by said energy storing device, and register operated trip means for releasing said latch device.

11. In predetermining mechanism for fluid meters as defined in claim 9, latch means releasably connecting said valve actuating means with said control means, and means connected with said energy storing device to trip said latch means and release said connecting means substantially simultaneously with the disconnection of said control means from the meter driven shaft.

12. In predetermining mechanism for fluid meters as defined in claim 11, means restraining effective operation of said energy storing device to connect or disconnect said control means to or from the meter driven shaft, and register operated trip means for releasing said restraining means.

13. A fluid flow control valve comprising means for directing and throttling the flow of fluid through the valve including a member mounted to oscillate about a fixed axis to open and close the valve, a shaft operatively connected to said member, a manually operable member fixed to said shaft to rotate the same in one direction and open the valve, a weight carried by said member acting by gravity to apply cumulative torque to said shaft in the opposite direction to close the valve, means for controlling the rotation of said shaft by gravity generated torque, means for releasably latching said control means to said manually operable member to transmit throttling movement to said valve member, and means for tripping said latch means to release position to rapidy actuate said valve member to fully close the valve by said weight independently of the control means.

14. A fluid flow control valve as defined in claim 13, wherein said control means comprises a sleeve loosely mounted on said shaft, a worm, and a one-way drive connection between said worm and sleeve permitting unitary rotation of said shaft and sleeve under control of said worm in valve closing direction and independently of said worm in valve opening direction.

15. A fluid flow control valve as defined in claim 13, wherein said control means comprises a worm and worm gear together with means rotatably mounted on the shaft and coacting with means on the worm gear to connect said shaft and gear by said latch means for unitary rotation in valve closing direction under control by said worm.

16. A fluid flow control valve as defined in claim 14, wherein said latch means comprises a spring biased latch pawl carried by said sleeve, and a shaft journalled on said manually operable member for manual operation independently of said tripping means and having a latching part coacting with said pawl.

17. A fluid flow control valve comprising a valve body, a valve plate fixed in said valve body having spaced groups of fluid outlet openings, a flexible flap associated with each group of openings secured at one end to said plate at the upstream side thereof and normally held by fluid pressure in sealing contact with the plate to close said openings, and means for directing individual fluid streams through the valve body and the respective groups of outlet openings, comprising a plurality of relatively fixed blades oscillatably mounted in the valve body, adapted to engage and lift said flexible flaps and to control return movement of said flaps under fluid pressure to normal position to throttle the flow of fluid through said outlet openings.

18. A fluid flow control valve as defined in claim 17, wherein said blades are spirally curved about a common axis of oscillation.

19. A fluid flow control valve as defined in claim 18, together with additional stationary spirally curved blades alternating with said oscillating blades and fixed to said valve plate.

20. A fluid flow control valve comprising a valve body having an internal wall provided with spaced fluid inlet openings and a valve plate having spaced groups of fluid outlet openings fixed in the valve body in spaced relation to said wall, flexible valve flaps secured at one end to the inner side face of said plate and held by fluid pressure in sealing contact therewith over the respective groups of outlet openings, a shaft fixed at one end in said valve plate, spirally curved blades integrally joined by a hub oscillatably mounted on said shaft, a plate fixed to said blades in clearance relation to said body wall and having openings cooperating with the openings in said wall to control the inlet of fluid between said wall and valve plate, said openings being in non-registering relation in the closed position of said valve flaps, relatively stationary spiral blades alternating with said oscillating blades and fixed to said valve plate, said oscillating blades adapted to engage and lift said valve flaps prior to full registration of said inlet openings and cooperating with said stationary blades to direct the fluid in spiral streams to the respective groups of outlet openings in the valve plate.

21. A fluid flow control valve as defined in claim 20, together with a spring seated check valve at the outlet side of said valve body preventing reverse fluid pressure flow through said outlet openings on the valve flaps.

22. In a fluid flow control valve, a valve body, a valve plate fixed in said valve body and having a part therethrough, a flexible flap secured at one end to said valve plate and normally held by fluid pressure against the face of said plate in sealing relation to said port, and a movable blade obliquely inclined with respect to the line of fluid flow having a lifting edge movable under the free end of said flap and controlling movement of said flap to open and closed position with respect to said port.

23. Fluid dispensing apparatus comprising: a fluid meter; valve means controlling fluid flow through said meter; means for manually operating said valve means to open position; a first member connected with a part of said operating means for actuating said operating means in valve closing direction; means for restraining said member against effective operation including control means, and releasable means, operable in the manual operation of said valve means to open position, to releasably connect said control means with said member; a first means, including a member operated by said meter, for engaging said meter operated member with said control means to actuate said control means to control a partial closure of said valve means by said first member; and second means for disengaging said control means and said meter operated member and simultaneously enabling said releasable means to release connection between said control means and said first member to effect a further closure of said valve means.

24. Fluid dispensing apparatus as defined in claim 23, wherein said control means includes a rotatable member and the means drivingly connecting said member with the meter operated member includes a flexible drive shaft.

25. Fluid dispensing apparatus as defined in claim 23, wherein said part of the valve operating means comprises a rotatably mounted shaft and said control means comprises constantly meshed gear elements one of which has a one-way driving connection with said shaft.

26. Fluid dispensing apparatus as defined in claim 25, in which said member for actuating the valve operating means in valve closing direction comprises a torque applying weight fixed to said shaft.

27. A fluid meter having an outlet flow controlling valve means comprising a member mounted for movement about a fixed axis, means to open and close said valve means including means for transmitting and applying cumulatively generated torque to said member to move the same in valve closing direction, means controlling the transmission of said torque, said transmitting means comprising a shaft operatively connected with said member, means releasably latching said control means to said shaft to govern the throttling movement of said valve member, and means for tripping said latch means to release position to cause said torque transmitting means to rapidly actuate said valve member and fully close said valve means independently of said control means.

28. A fluid meter as defined in claim 27, wherein said control means comprises a driven member, together with means operable to establish a motion transmitting connection between said member and a driven part of the meter and to disable said connection at predetermined times in the operating cycle of the meter.

29. In combination with a fluid meter having a housing for a meter driven shaft and a valve connected with the outlet of the meter, predetermining mechanism controlling the closing movement of the valve including a register tripped latching unit mounted on said shaft housing, an adaptor unit mounted upon said latching unit, a register unit supported upon said adaptor unit for angular movement relative to the meter about the axis of said meter driven shaft, mechanism operatively connecting said shaft with the register including relatively movable coacting drive transmitting elements mounted in said adaptor unit and permitting said angular movement of the register without altering the reading thereof.

30. The combination defined in claim 29, wherein said adaptor unit comprises a body member on which the register unit is mounted and a housing member rotatably mounted within said body member, and said coacting elements comprise a gear assembly within said housing member having opposed gear elements fixed to the adaptor and register units respectively.

31. In a fluid control meter assembly, a pipe line having a meter rigidly connected therein, a register unit above said meter and having a counter visible through a side face thereof, drive means between the meter and counter, means mounting said register unit on said meter for rotation between positions for displaying said counter at opposite sides of said meter, and means coacting with said drive means compensating for said rotation of the register for actuating said counter only by said drive means.

32. In a fluid control valve, a valve body having a port therein, a flexible flap secured at one end and extending over said port so as to cover the port, said flap being maintained in covering relation to said port by pressure of the fluid controlled by said valve, and a valve operating member mounted in said body for rotation about an axis substantially parallel to the direction of fluid flow through the port having a lifter blade adapted to move under the free end of said flap to uncover said port.

33. In a fluid control valve, a valve body having an internal wall provided with a fluid admitting port that is surrounded by a flat wall surface on the inlet side, a flexible flap fixed at one end to said wall and extending over the inlet side of said port so as to be normally urged by line fluid pressure against said surface to cover the port, a rotatable blade mounted in said body adapted to move under the free end of said flap and uncover said port when the blade is rotated.

34. In a fluid control valve, a valve body, a wall within said body having a fluid admitting port therethrough, a flexible flap secured adjacent one end to said member and normally held by fluid pressure against said member and over said port to close the latter, a movable valve operating member having a blade inclined with respect to the line of fluid flow through said port, said blade having a lifting edge disposed adjacent said member and located to move under the free end of said flap to open the port when said device is moved, and means for moving said valve operating member.

35. In a fluid control valve, a valve body, a fixed internal wall in said body, a fluid admitting port through said wall and a flat surface on said wall surrounding the inlet end of said port, a flexible flap fixed along one end to said wall and extending over said port so as to be urged against said surface to close the port by line fluid pressure, a shaft journaled in said body and passing through said wall, and an inclined blade fixed on said shaft having an edge disposed to move under the free end of the flap and uncover the port when said shaft is rotated.

36. In the fluid control valve defined in claim 35, a plurality of said ports being provided in said wall, all radially outwardly of said shaft, a separate flap for each port, and a separate edge on said blade coacting with each flap.

37. A fluid flow control valve comprising a valve body, a valve plate in said valve body and having ports therethrough, flexible flaps secured at one end to said valve plate and normally held by fluid pressure against the face of said plate in sealing relation to said ports, movable blades obliquely inclined with respect to the line of fluid flow having lifting edges movable under the free ends of said flaps and controlling movement of said flaps to open and closed position with respect to said ports, a shaft operatively connected to said blades, a manually operable member fixed to said shaft to rotate the same in one direction and open the valve, a weight carried by said member acting by gravity to apply a cumulative torque to said shaft in the opposite direction to close the valve, means for controlling the rotation of said shaft by gravity generated torque, means for releasably latching said control means to said manually operable member to transmit throttling movement to said valve member, and means for tripping said latch means to release position to rapidly actuate said valve member to fully close the valve by said weight independently of the control means.

38. In a fluid dispensing apparatus: the combination of a fluid meter; valve means for controlling flow therethrough; movable means, biased toward valve closing, for controlling the closure of said valve means including a member having a plurality of stop shoulders thereon; a pivoted latching member adapted to successively engage and disengage with each of said stop shoulders to progressively allow biased movement of said control means; manually controlled means connected with said control means for opening said valve and engaging one of said stop shoulders with said latching member to retain said valve in open position; a non-rotatable shiftable member adapted to engage with said latching member to successively rock said latching member out of engagement with one of said shoulders and into engagement with an adjacent shoulder as said control means moves toward a valve closed position; and register means connected with said meter for successively shifting said shiftable member between two positions upon passage of respective successive predetermined quantities of fluid through said meter to thereby effect a staged closure of said valve means.

References Cited in the file of this patent

UNITED STATES PATENTS

| | | |
|---|---|---|
| 1,809,440 | Elder | June 9, 1931 |
| 1,831,965 | Marden | Nov. 17, 1931 |
| 1,857,627 | Elder | May 10, 1932 |
| 1,948,984 | Granberg | Feb. 27, 1934 |
| 2,114,207 | Berck | Apr. 12, 1938 |
| 2,265,325 | Steen | Dec. 9, 1941 |
| 2,289,867 | Beck | July 14, 1942 |
| 2,309,332 | Tancred | Jan. 26, 1943 |
| 2,382,454 | Thoresen et al. | Aug. 14, 1945 |
| 2,393,805 | Parker | Jan. 29, 1946 |
| 2,476,320 | Paulus | July 19, 1949 |
| 2,511,287 | Moore | June 13, 1950 |